UNITED STATES PATENT OFFICE.

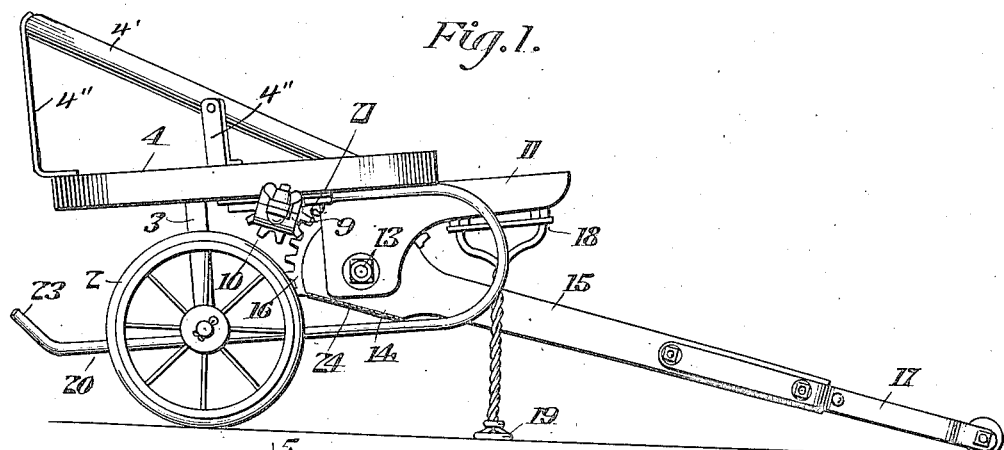
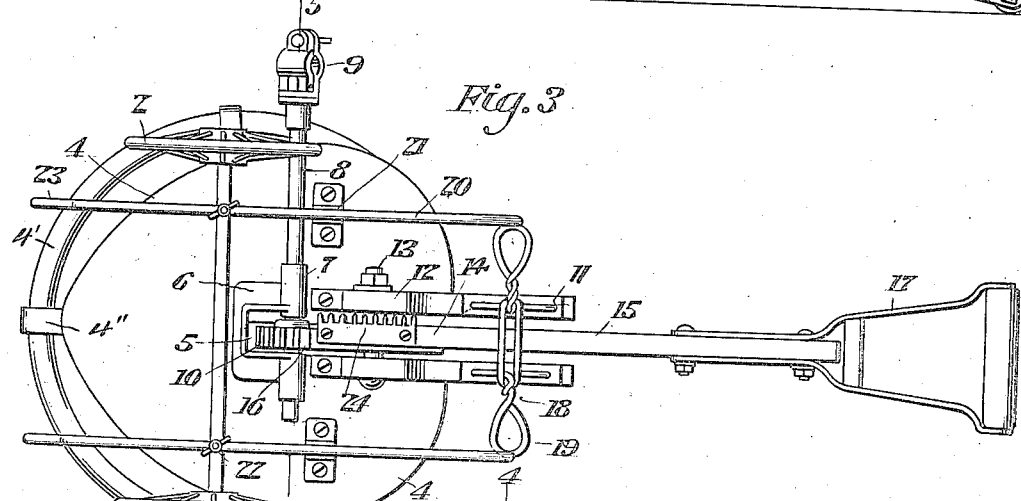
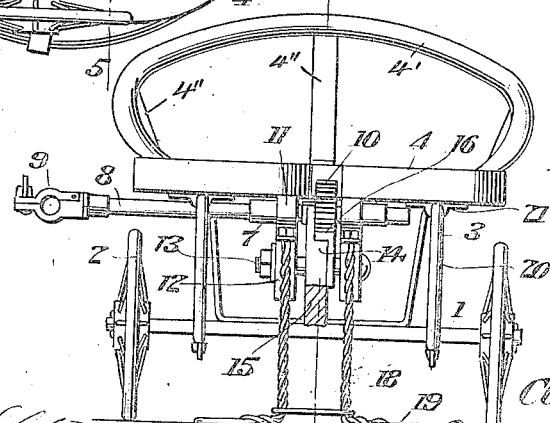

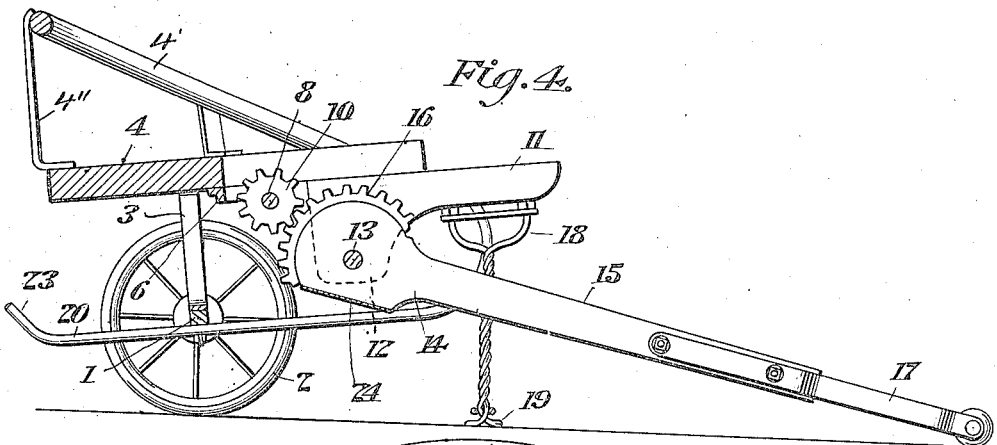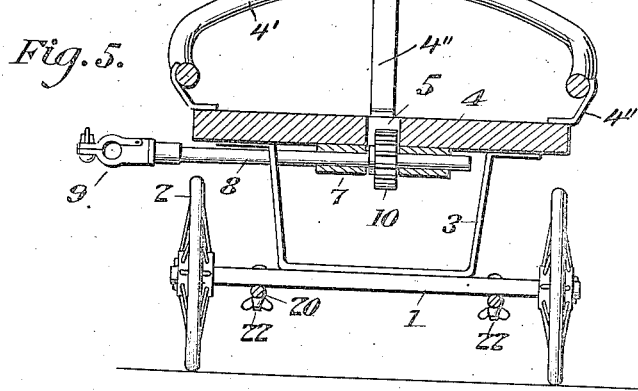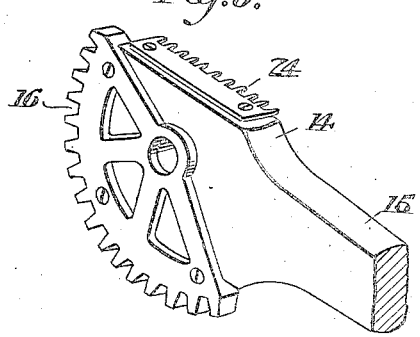

CLAUDE N. ALLEN, OF MICHIGAN CITY, INDIANA.

COMBINED GO-CART, UMBRELLA-SUPPORT, AND CARPET-BEATER.

1,247,485.  Specification of Letters Patent.  Patented Nov. 20, 1917.

Application filed September 6, 1916. Serial No. 118,713.

*To all whom it may concern:*

Be it known that I, CLAUDE N. ALLEN, a citizen of the United States, residing at Michigan City, in the county of Laporte and State of Indiana, have invented new and useful Improvements in Combined Go-Carts, Umbrella-Supports, and Carpet-Beaters, of which the following is a specification.

This invention relates to improvements in go-carts or the like, in which the handle for drafting the same is movably associated with the cart.

The chief characteristic of this invention is to provide an umbrella support which is automatically shiftable to active or inactive position by the handle of the cart.

Another characteristic of this invention resides in the provision of a go-cart in which the same means for supporting the umbrella is adapted to be used for supporting a carpet beater, the cart being adapted to be inverted whereby the beater may be actuated by moving the handle.

A further characteristic of this invention is to provide a handle of novel construction which may be utilized for stretching carpets, and which is detachably mounted upon the cart.

A further characteristic is to provide a go-cart which is simple, durable and efficient in construction and which may be manufactured at a nominal cost, the cart being provided with sleigh runners which are movably associated with the cart to perform the double function of preventing the tipping of the cart when in one position and for performing the function of sleigh runners when in another position.

Other characteristics of the invention will appear as the specification is read in connection with the accompanying drawings, in which:—

Figure 1 is a side elevation of the device constructed in accordance with my invention.

Fig. 2 is a front elevation of the go-cart.

Fig. 3 is a bottom plan view.

Fig. 4 is a longitudinal section taken on the line 4—4 of Fig. 2.

Fig. 5 is a transverse section taken on the line 5—5 of Fig. 3.

Fig. 6 is a detailed view of the handle.

Referring to the drawings in detail, my invention comprises an axle 1 upon the opposite ends of which are journaled the wheels 2, the wheels being of any suitable construction and preferably provided with rubber tires.

Secured to the axle 1 and upstanding therefrom are the bolsters 3 to the upper ends of which is secured the seat 4. The seat 4 is preferably formed of wood or the like and is substantially heart-shape, the bolsters 3 being secured adjacent the rear end of the seat as is clearly shown in the drawings. The broad side of the seat 4 is provided with a back rest 4' which is of arcuate formation and has its ends secured to the upper side, while its intermediate portion is supported in inclined relation to the seat by means of the uprights 4''. The seat is provided at its forward end with an inwardly extending slot 5 while secured to the underside of the seat at one end of the slot is a substantially U-shaped plate 6 which has the parallel portions thereof arranged upon the opposite sides of the slot, and provided with the alining bearings 7. Journaled within the bearings 7 and spanning the slot 5 is a shaft 8 which has one of its ends extending beyond the outer edge of the seat and is provided with a clamp 9 of any suitable construction. Keyed to the shaft 8 and disposed within the slot 5 is a pinion 10 which is of such a diameter as not to protrude beyond the upper side of the seat.

Secured to the underside of the seat 4 at the forward end thereof and disposed upon the opposite sides of the slot 5, is a pair of extensions 11 which are arranged in parallel spaced relation to each other and which are provided with ears 12. The ears 12 are formed with alined openings in which is detachably mounted an axle 13 while, mounted upon the axle between the ears 12 is the enlarged end 14 of the handle 15. The enlarged end 14 is provided with a segmental gear 16 which engages and operates the pinion 10. The handle 15 has its outer free end provided with a handle grip 17, the same being of any suitable construction.

It will be manifest from the foregoing construction that when the handle is swung or oscillated in the path of an arc, the segmental gear 16 will rotate the pinion 10 and consequently the shaft 8, whereby the clamp 9 will be oscillated.

The clamp 9 is adapted to receive an umbrella or carpet beater. When using an umbrella to protect the occupant of the co-cart from the elements, it will be evident that when the handle is in inactive position or resting upon the ground as is shown in Fig. 1, the umbrella will assume a horizontal position at one side of the cart thus allowing the occupant to enter and leave the cart without the liability of breaking the umbrella. Upon elevating the handle 15 when drafting the cart, it will be evident that the movement of the handle will actuate the shaft 8 and consequently the clamp 9 so as to cause the umbrella to assume a vertical position above the seat whereby the occupant may be protected from the elements during movement of the cart.

When using the device as a carpet beater, the umbrella is removed from the clamp whereby the carpet beater is inserted. The cart is then inverted whereby the handle 15 and the beater may be in convenient position to facilitate the beating of the carpet. Upon movement of the handle, the shaft 8 will be oscillated to impart a similar movement to the carpet beater whereby the carpet may be thoroughly cleaned. The operator may place his foot upon the back rest to steady the cart during the beating operation as will be undestood.

To insure the proper actuation of the handle 15 and furthermore to support the cart in horizontal position when the same is at rest, I have provided the extensions 11 with depending brackets 18 which have their lower ends provided with laterally extending feet 19, the latter being adapted to engage the ground to support the cart in horizontal position. The handle 15 works between the brackets 18, the brackets serving to prevent excessive movement of the handle and of the segmental gear 16, to prevent the accidental disengaging of the gear with the pinion 10.

To prevent the backward tilting of the cart and furthermore to permit the cart to be converted from a wheeled vehicle to a sleigh, the underside of the seat is provided with substantially J-shaped runners 20, the short arm of the runners being detachably mounted within the brackets 21 which are secured to the underside of the seat. The longer arm of each of the runners is detachably secured to the axle 1 by means of the bolts 22. It is to be understood that when the runners are in this position, they are inactive and are detachably mounted to permit the same to be secured to the periphery of the wheels when in active position to form the sleigh runners for the vehicle, as will be understood. In this instance I have shown no means for securing the runners to the wheels but any suitable clamps may be used to securely hold the runners upon the wheels, the curved portion of the runners engaging the forward periphery of the wheel, while the longer arms of the runners form the tread surfaces.

It will be manifest from the foregoing that the cart may be readily converted from a wheel vehicle to a sleigh and that the runners perform the double function of preventing the tilting of the cart and to permit the cart to be used as a sleigh. In this instance the rear ends of each of the runners 20 are provided with upturned portions 23 which act as rests for the cart when the same is in tilted position.

When using the device as a carpet stretcher, the handle 15 is removed from the cart by means of removing the axle 13 as will be understood. I have provided the underside of the enlarged end 14 with a series of connected spurs 24. After the handle is detached from the cart, the spurs 24, which are disposed laterally of the handle, are adapted to be inserted into the carpet and by exerting pressure upon the handle with the knees, the carpet may be stretched as will be understood.

It is thought from the foregoing taken in connection with the accompanying drawings that the construction and operation of my device will be apparent to those skilled in the art, and that minor changes in size, shape, and proportion and minor details of construction may be made without departing from the spirit and scope of the appended claims.

What I claim is:—

1. A device of the class described comprising a wheel cart, a handle pivoted to the cart, a clamp rotatably mounted upon the cart, and means interposed between the handle and the cart for rotating said clamp upon movement of said handle.

2. A device of the class described comprising a cart, a handle swingingly mounted upon the cart, a segmental gear carried by said handle, a shaft journaled on the cart, a pinion connected to said shaft, and a clamp carried by said shaft.

3. A device of the class described comprising a cart, a handle swingingly mounted upon the cart, a clamp rotatably mounted upon the cart, and means interposed between said handle and said clamp for imparting movement to the clamp upon movement of the said handle, the handle being so associated with the clamp as to cause the latter to assume a vertical position when the handle is in drafting position.

In testimony whereof I affix my signature.

CLAUDE N. ALLEN.